Sept. 14, 1965         H. J. LOEHLEIN         3,205,560
METHOD OF MAKING A PRESSURE WELDED FINNED PANEL
Filed April 27, 1956                           2 Sheets-Sheet 1

*INVENTOR.*
HAROLD J. LOEHLEIN
BY
ATTORNEY

Sept. 14, 1965     H. J. LOEHLEIN     3,205,560
METHOD OF MAKING A PRESSURE WELDED FINNED PANEL
Filed April 27, 1956     2 Sheets-Sheet 2

*INVENTOR.*
HAROLD J. LOEHLEIN
BY
ATTORNEY

United States Patent Office 3,205,560
Patented Sept. 14, 1965

3,205,560
METHOD OF MAKING A PRESSURE WELDED FINNED PANEL
Harold J. Loehlein, Louisville, Ky., assignor to Reynolds Metals Company, Louisville, Ky., a corporation of Delaware
Filed Apr. 27, 1956, Ser. No. 581,092
4 Claims. (Cl. 29—157.3)

This invention relates to finned panels such as finned heat exchangers.

Previously, finned heat exchangers have been manufactured by complicated, time-consuming and expensive methods involving the soldering or welding of the fins. The resulting heat exchangers often were inferior and unsatisfactory because of bonding defects resulting in low mechanical strength, and a high ratio of weight to heat transfer capacity.

The principal object of this invention is to provide a simpler, faster and cheaper method of manufacturing finned heat exchangers, which enables the exchanger to be contemporaneously equipped with a large number of integral fins thereby providing for maximum heat transfer efficiency.

A further object of this invention is to provide a finned heat exchanger, at least equal and possibly superior to those produced by previously known methods, which has a large number of integrally bonded fins with a minimum amount of surface area.

Briefly, this invention comprises: assemblying two or more foreshortened fin-forming metal sheets in superposed face-to-face relationship upon a panel-forming or base sheet; pressure welding the assembly with appropriate fore-shortened fin-forming patterns of stop-weld material interposed between the inner face of each fin-forming sheet and the adjacent face of the adjacent sheet to produce an integral elongated panel having corresponding unbonded fin-forming portions between sheets; slitting the unbonded fin-forming portions to free them for bending purposes; and then bending them outwardly to form integral fins. It will be readily appreciated that this method is a simple one which can be readily performed at low cost.

The invention will be described in greater detail in the following description taken in conjunction with the accompanying drawings wherein.

Figure 1:
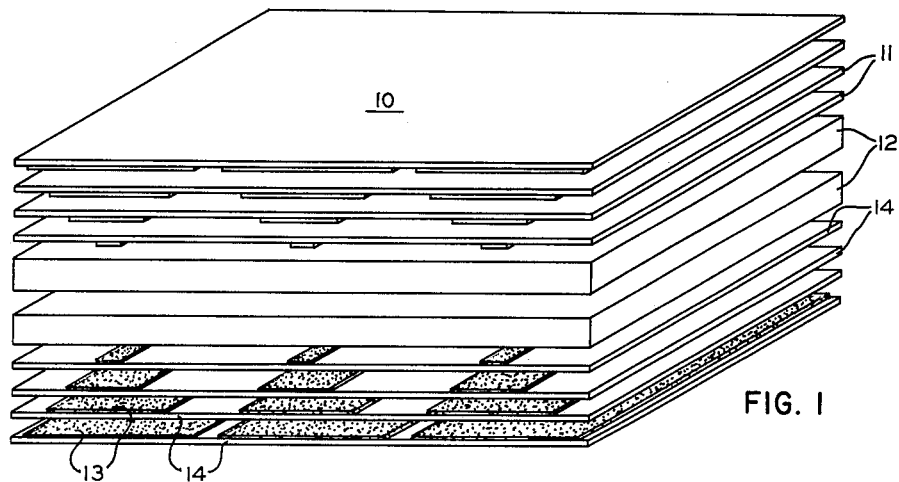
FIG. 1 is an exploded perspective view of an assembly of fore-shortened sheets with appropriate fore-shortened patterns of stop-weld material interposed between them prior to the pressure welding step.
Figure 2:
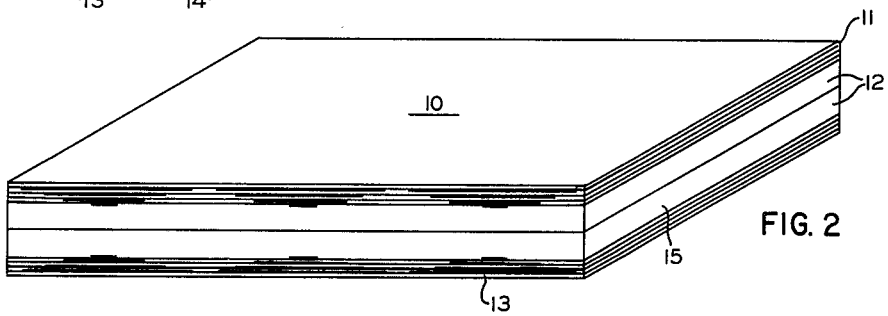
FIG. 2 is a perspective view of the elongated panel after the pressure welding step; the length dimension of this panel being reduced to about ¼ or ⅕ of its actual length.
Figure 3:
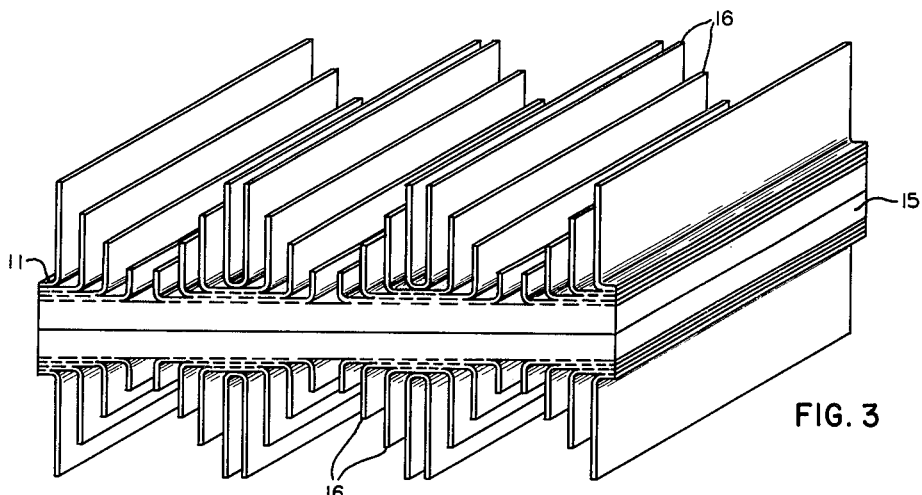
FIG. 3 is a perspective view of the panel of FIG. 2 after the fin-forming step.

FIG. 1 illustrates an assembly 10 of a plurality of superposed foreshortend fin-forming metal sheets 11 arranged on each side of a pair of foreshortened passageway-forming metal sheets 12, which preferably are thicker than the fin-forming sheets 11. A passageway pattern of stop-weld material normally is interposed between the sheets 12.

Appropriate foreshortened fin patterns of stop-weld material 13 are interposed in alignment between the outer face of each sheet 12 and the adjacent sheet 11 and the adjacent faces of successive sheets 11 so as to form a stack or group of overlapping fin paterns as illustrated in FIG. 1. These fin patterns 13 preferably cover rectangular areas between the sheets and extend from one edge 14 along the entire length of the panel to the opposite end edge 14. The widths of the aligned fin patterns progressively increase from the innermost fin pattern to the outermost fin pattern. Several stacks or groups of aligned patterns are spaced across the width of the panel. When desired they can be made to extend across the width of the panel at intervals along its length.

The foreshortened passageway pattern of stop-weld material is desired to produce a finned expanded passageway panel. However, this invention contemplates the production of fins on panels which do not contain internal passages. One use of such a panel might be as a heat exchange wall separating two gaseous mediums.

The sheets 11 and 12 are spot-welded or otherwise conventionally secured together as they are superposed to form the assembly 10. The latter is then conventionally welded into an elongate panel 15 by heating and roll reducing. The resulting panel 15 has unbonded areas or portions corresponding to the fin patterns 13.

The panel 15 is now slit, by a suitable cutting tool, centrally of and longitudinally along the unbonded areas formed by the fin patterns 13. These slits are made deep enough to extend through the sheets 11 but not into the thicker sheets 12.

Next the free unbonded portions of the original sheets 11 are bent outwardly on either side of the slits to form a plurality of fins 16 longitudinally spaced along the panel 15. The number, spacing and size of the fins 16 are controlled by the number of original sheets 11, and the widths and spacing of the stop-weld fin patterns. Thus a large number of fins can be readily developed along a minimum amount of panel surface. Further, such fins are integral with the panel forming highly efficient heat transfer surfaces.

In making a finned passageway panel, the unbonded portion between the sheets 12 would next be expanded by the introduction of fluid under pressure to form passages.

As a variation of the fin developing process, prior to the slitting step, the unbonded fin-forming areas of the panel 15 can be expanded by fluid pressure much the same as the passageway panel. In this way, the depth of the slitting tool would not have to be exact to keep it from cutting into the thicker sheets 12 of the panel 15.

Figure 4:
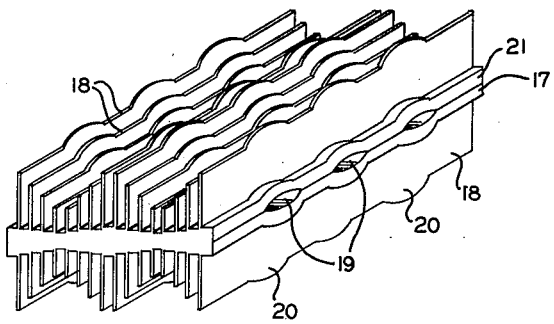
FIGS. 4 to 7 are perspective views of several embodiments of expanded passageway panels having fins.

FIG. 4 illustrates an expanded passageway panel 17 having a plurality of fins 18 extending from its opposite sides and including a plurality of transverse fluid passages 19. The portions of the fins adjacent the passages 19 have humped edge portions 20 which are caused by forming the fins 18 prior to pressure expanding the unbonded portions between the sheets 21 to form the passages 19.

Figure 5:
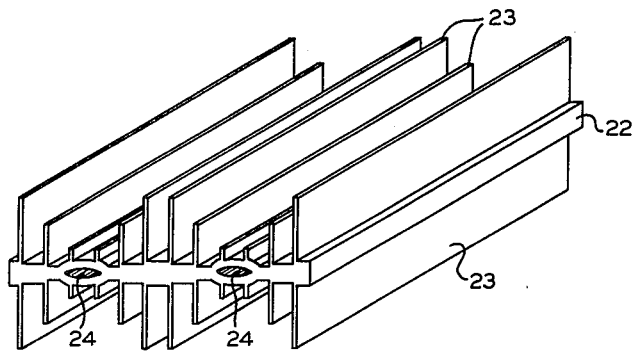

FIG. 5 illustrates a finned passageway panel 22 having a plurality of fins 23 extending from its opposite sides and having passages 24 extending parallel to the fins 23.

Figure 6:
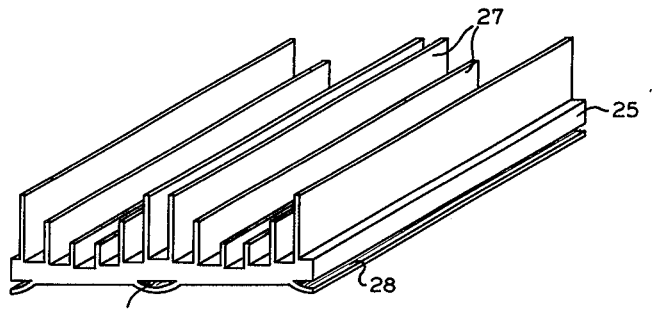
Figure 7:
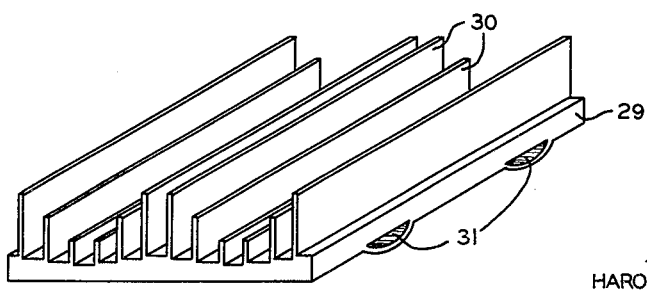

FIG. 6 illustrates a finned passageway panel 25 having a plurality of fins 27 extending from only a single surface and having passages 28 extending parallel to the fins 27. The expanded walls of the passages 28 are limited to the surface of the panel 25 opposite the finned surface.

The passages 28 and 31 of the panels 25 and 29, respectively, are preferably expanded prior to slitting and forming the fins 27 and 30. In this manner, during the expansion of the passages 28 and 31, the welded fin-forming sheets will aid in substantially restricting the expansion to the opposite panel surface.

Having described my invention, I claim:
1. A method of making a finned panel comprising: assembling at least two foreshortened fin-forming metal sheets in adjacent superposed face-to-face relationship upon a foreshortened panel-forming metal sheet with a foreshortened fin-forming pattern of stop-weld material interposed between that face, of each fin-forming sheet, which is most adjacent to said panel-forming sheet, and the adjacent face of the adjacent sheet, said fin forming patterns overlapping one another in a direction proceeding outward from said panel-forming sheet to provide a group of overlapping fin-forming patterns, said group of overlapping fin-forming patterns including a relatively narrow inner pattern on the panel side of the innermost fin-forming sheet and a relatively wide outer pattern on the inner side of the outermost fin-forming sheet; pressure welding said assembly into an elongate panel having overlapping unbonded fin-forming portions corresponding to said group of overlapping fin-forming patterns; slitting said overlapping unbonded portions of said fin-forming sheets to free their fin-forming portions; and bending said fin-forming portions outwardly to form fins.

2. The method of claim 1 including: performing said assembling step with a plurality of groups of overlapping fin-forming patterns spaced along said sheets.

3. The method of claim 1 including: performing said assembling step with a plurality of overlapping fin-forming sheets with interposed fin-forming patterns superposed on both sides of said panel-forming sheet.

4. The method of claim 1 including: performing said assembling step with a panel-forming metal sheet which includes at least two foreshortened passageway-forming sheets with an appropriate foreshortened passageway pattern of stop weld material interposed therebetween; and, after welding said assembly, introducing fluid under pressure into the unbonded areas formed by said passageway pattern to form a passageway.

References Cited by the Examiner

UNITED STATES PATENTS

| | | | |
|---|---|---|---|
| 634,469 | 10/99 | Majert. | |
| 1,833,985 | 12/31 | Chavara et al. | 257—139.5 |
| 2,375,334 | 5/45 | Valyi et al. | |
| 2,573,538 | 10/51 | Brown | 257—262.22 |
| 2,690,002 | 9/54 | Grenell | 29—157.3 |
| 2,740,188 | 4/56 | Simmons | 29—157.3 |
| 2,766,514 | 10/56 | Adams | 29—157.3 |

WHITMORE A. WILTZ, *Primary Examiner.*

HERBERT L. MARTIN, *Examiner.*